2,191,578

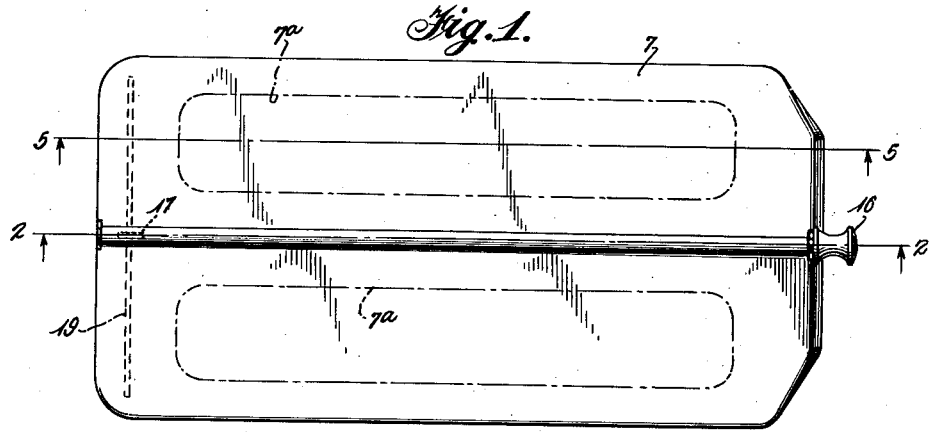
Feb. 27, 1940. R. H. MONEY 2,191,578
ICE-CREAM TRAY
Filed July 24, 1939 2 Sheets-Sheet 1
Inventor
Roland H. Money
By
Bacon + Thomas
Attorneys Feb. 27, 1940.    R. H. MONEY    2,191,578
ICE-CREAM TRAY
Filed July 24, 1939    2 Sheets-Sheet 2
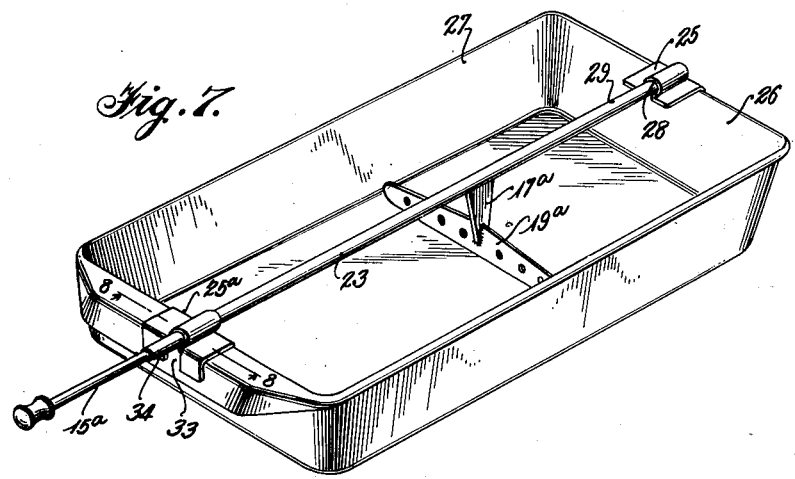
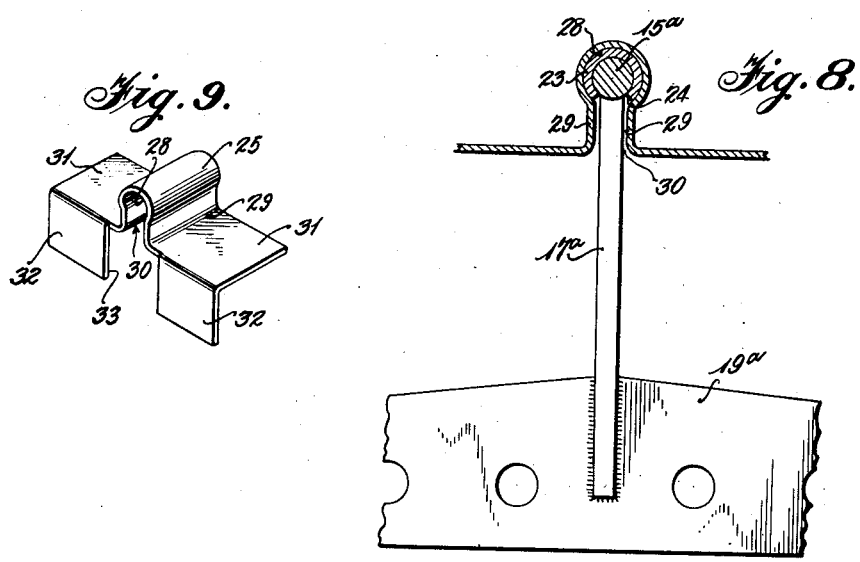
Inventor
Roland H. Money
By Bacon + Thomas
Attorneys Patented Feb. 27, 1940

UNITED STATES PATENT OFFICE 2,191,578

ICE-CREAM TRAY

Roland H. Money, Mount Healthy, Ohio, assignor to The Crosley Corporation, Cincinnati, Ohio, a corporation of Ohio Application July 24, 1939, Serial No. 286,245

15 Claims. (Cl. 62—114)

The present invention relates to a tray for use in making frozen desserts such as ice cream, sherbet, etc., which is adapted to be inserted in the freezing compartment of a mechanical refrigerator, and to means for manually agitating the contents of said tray periodically without necessitating the removal of said tray from said freezing compartment.

The invention further relates to an agitating means or accessory adapted for use with conventional ice cube trays of given size.

The invention still further relates to an agitating means or accessory which is adjustable and adaptable for use with trays or receptacles of various size.

It is well known that smooth and grainless ice cream can only be made by continuous or frequent agitation of the mix during freezing; otherwise ice crystals will be formed, and unless these are disturbed or retarded during formation the ice cream will have a grainy consistency. The same is true of other forms of frozen dessert.

Accordingly, one of the principal objects of the invention is to provide agitating means for use with a freezing tray or receptacle which can be manually operated as frequently as desired to overcome the presence of ice crystals in the ultimate dessert by scraping such crystals from the lower walls of the tray where they first form, and by breaking the same up and/or thoroughly intermixing the same with less cold portions of the mix in which they will melt and thus disappear.

Another object of the invention is to provide agitating means which can be used with conventional ice cube trays without requiring any modification or mutilation of such trays.

Another object of the invention is to provide a cover unit provided with agitating means and adapted to be frictionally maintained in assembled relation with a freezing tray.

A further object of the invention is to provide agitating means which is adapted for use with freezing trays or receptacles of various size.

Another object of the invention is to provide a tray and agitating means therefor which will permit inspection of the contents when desired without removal of a closure member from the tray.

Another object of the invention is to provide a structurally simple and relatively inexpensive means for making smooth and grainless ice cream and other desserts in a domestic refrigerator.

Still another object of the invention is to provide agitating means for use with a tray in making frozen desserts which consists of a minimum of moving parts and which can be quickly and easily cleaned after use.

Other and further objects of the invention will be apparent from the following description taken in connection with the accompanying drawings in which:

Fig. 1 is a plan view of a tray and agitating accessory made in accordance with the invention;

Fig. 2 is a longitudinal sectional view through the tray taken on the line 2—2 of Fig. 1;

Fig. 3 is an enlarged transverse sectional view taken on the line 3—3 of Fig. 2;

Fig. 4 is a perspective view of the agitator blade and rod for operating the same;

Fig. 5 is an enlarged fragmentary sectional view taken on the line 5—5 of Fig. 1 illustrating the manner in which the lid or cover is frictionally held on the tray;

Fig. 6 is a fragmentary elevation of the fold or channel formed in the cover or lid;

Fig. 7 illustrates a modified form of the invention which is adapted for use with trays or receptacles of various size;

Fig. 8 is an enlarged sectional view taken on the line 8—8 of Fig. 7; and

Fig. 9 is a perspective view of one of the bracket elements shown in Fig. 7.

Referring now to the form of the invention shown in Figs. 1 to 6, inclusive, the numeral 1 generally indicates a conventional ice cube tray having the usual bottom wall 2, side walls 3 front wall 4, rear wall 5 and a projecting drawer pull 6. A cover plate or lid 7 overlies the top of the tray and forms a closure therefor. The lid 7, as best shown in Fig. 5, has a depending flange 8 at the rear end thereof adapted to engage a bead 9 formed by turning over the upper edge of the rear wall 5 of the tray. The cover 7 also has a front edge 10 which is turned downwardly and adapted to cooperate with an inclined portion 11 of the drawer pull 6 to frictionally maintain said cover in assembled relation with the tray.

The cover 7 is further provided with a fold intermediate its side edges which provides a groove or channel 12 of generally circular contour, but open at its lower side to provide a gap 13 between substantially vertical opposed walls 14 as best shown in Figure 6.

A rod 15 is slidably mounted and supported in the channel 12 and carries a knob 16 at one end thereof adapted to be gripped by the user to reciprocate said rod in said channel. A tapered arm 17 is suitably secured to the rod 15 adjacent the opposite end thereof. The lower end of the arm 17 is provided with a slot 18 adapted to receive and securely carry a dasher or agitator blade 19.

As is best shown in Figure 3, the lower surface 20 of the agitator blade 19 is substantially flat and is adapted to engage the bottom wall 2 of the tray. The ends of the agitator 19 are preferably rounded as indicated at 21 and the length of said blade is preferably made slightly less than the width of the tray at the bottom thereof to permit free reciprocation of the blade in the tray. In order to facilitate agitation and breaking up of ice crystal formations, the blade 19 is provided with a series of spaced apertures 22.

The rod 15, arm 17, and blade 19 may be said to constitute an agitating unit (see Fig. 4). The agitating unit may be assembled in the cover 7 by simply sliding the rod 15 into the fold or channel 12. The gap 13 of the channel is so proportioned that it permits the arm 17 to be slidably received therein, and while the wall portions 14 do not snugly engage the arm 17 they serve as a substantial guide means therefor.

It will be apparent from the foregoing that the contents of the tray 1 may be agitated by gripping the knob 16 on rod 15 and reciprocating the agitating blade 19 in the tray. Such reciprocation of the blade will loosen any crystals formed on the bottom and lower side walls of the tray and also serve to produce a more intimate mixing of the contents of the tray. Agitation may be repeated as often as desired.

It will also be apparent that after the device has been used, it is a simple matter to remove the agitating unit from the cover to permit thorough and complete cleansing thereof.

If desired, the cover 7 may be provided with elongated slots 7a (shown in dot and dash lines in Fig. 1) to permit inspection of the contents of the tray without raising said cover.

Referring now to a further modified form of the invention illustrated in Figs. 7 to 9, an agitating unit similar to that shown in Figure 4 is adapted to have the rod 15a thereof slidably received in a tube 23. The tube 23 is split or provided with a slot 24 extending longitudinally thereof. One end of the tube 23 is received in a bracket 25 adapted to rest upon the rear edge 26 of a receptacle 27. The bracket 25 is provided with a substantially circular fold or channel 28 adapted to receive one end 29 of the split tube 23. The bracket 25 may be permanently secured to the tube 23, or it may have a tight frictional engagement therewith, as desired.

The channel 28 is bordered by substantially vertical wall portions 29 providing a gap 30 adapted to be positioned below the slot 24 of the tube 23, as best shown in Figure 8. The vertical wall portions 29 merge into horizontal wall portions 31 adapted to rest upon an edge of the tray. Flanges 32 depend from the walls 31 and are arranged to engage an end wall of the tray. The flanges 32 are spaced apart to form a gap 33 as best shown in Figure 9.

The opposite end 34 of the split tube 23 is received in a bracket 25a similar to the bracket 25. The bracket 25a may be permanently secured to the tube 23 or the same may be frictionally engaged therewith. In any event, at least one of the brackets 25 or 25a is frictionally mounted upon the tube 23 so that it can be adjusted or moved longitudinally thereof to mount the tube 23 upon receptacles or trays of various lengths. For example, as shown in Figure 7, the bracket 25a may be moved toward the extremity 34 of the tube 23 to accommodate a larger tray than that illustrated.

An agitator blade 19a may be secured to the rod 15a by an arm 17a in the manner described hereinbefore in connection with the form of invention shown in Figures 1 to 6.

In assembling the agitating unit in the split tube 23, it will be apparent that the rod 15a may be readily received in said split tube with the arm 17a extended through the slot 24 thereof. It will also be apparent that said arm may be readily passed through the bracket 25a by virtue of the gap 33 provided between the flanges 32, and the gap 30 formed between the vertical wall portions 29. With the agitator unit and tube thus assembled, the bracket 25 may be positioned to rest upon the rear edge of the receptacle and the bracket 25a adjusted on the tube 23 until it snugly engages the front wall of the receptacle. It will be obvious that the agitator blade 19a may be reciprocated in the receptacle 26 by working the rod 15a back and forth in the tube 23.

While preferred forms of the invention have been shown and described herein to illustrate the principles thereof, it will be understood that the same may be embodied in still other forms and therefore the invention is not limited to the specific structures shown, but is to embrace all forms falling within the spirit and scope of the appended claims.

What I claim is:

1. Agitating means for use with a tray for agitating the contents thereof comprising, a member providing a channel, said channel being open at its opposite ends; a rod; an arm depending from said rod; and an agitator blade carried by said arm, said rod with its depending arm being insertable in said channel through an open end of said channel.

2. Agitating means for use with a tray for agitating the contents thereof comprising, a member provided with a channel extending lengthwise thereof; a rod reciprocally mounted in said channel; an arm depending from said rod and extending through the open side of said channel; and an agitator blade carried by said arm at the lower end thereof.

3. Agitating means for use with a receptacle for frozen desserts comprising, a member having a fold extending longitudinally thereof, said fold being formed by an arcuate wall merging into spaced wall portions which provide a gap opposite said arcuate portion; a rod reciprocally supported relatively to said fold; an arm depending from said rod and extending through said gap; and agitating means carried by said rod adapted to be received in and slid along the bottom of a receptacle.

4. A device for making ice cream, etc., in the freezing compartment of a refrigerator comprising, a tray; a cover for said tray, said tray and cover having means mutually cooperable for frictionally retaining the same in assembled relation; a groove formed in said cover; a rod reciprocally guided in said groove; a knob mounted upon one end of said rod; and agitating means supported by the opposite end of said rod received in said tray and slidable along the bottom thereof.

5. A device for making ice cream, etc., in the freezing compartment of a refrigerator comprising, a tray; a cover for said tray, said cover having an opening formed therein to permit inspection of the contents of said tray and also having a longitudinally extending groove formed therein; a rod reciprocally guided in said groove; a knob mounted upon one end of said rod, and agitating means supported by the opposite end of said rod received in said tray and slidable along the bottom thereof.

6. Agitating means for use with a conventional ice cube tray comprising, a lid member adapted to form a closure for a tray, said lid member having a fold formed substantially medially thereof and open at its lower side; a rod reciprocally supported in said fold; an arm secured to said rod and extending through the open side of said fold; and agitating means carried by said rod adapted to engage and scrape the bottom of said tray.

7. Means for making a substantially smooth and grainless frozen dessert comprising, a tray adapted to be received in a freezing compartment of a refrigerator; a member resting upon an edge of said tray, said member being bent to provide an elongated channel extending lengthwise thereof, said channel having its open side nearest to said tray; a rod slidably guided in said channel; and agitating means supported by said rod adapted to be slid along the bottom of said tray.

8. Agitating means for use with a freezing tray comprising, a lid member adapted to form a closure for a tray, said lid member being bent to provide a fold extending from end to end thereof; a rod slidably guided by said fold; and agitating means connected with said rod adapted to engage and scrape the bottom of said tray.

9. Means for making a substantially smooth and grainless frozen dessert comprising, a tray adapted to be inserted in the freezing compartment of a refrigerator; a plate overlying at least a portion of said tray, said plate having a fold formed between its sides lying in a plane above the main body of said plate, said fold being open on the side thereof adjacent to said tray; a rod reciprocally guided in said fold; and agitating means supported by said rod adapted to be slid along the bottom of said tray.

10. Means for making a substantially smooth and grainless frozen dessert comprising, a tray adapted to be received in a freezing compartment of a refrigerator; a cover for said tray, said cover being bent to provide an elongated groove extending lengthwise thereof, said groove having its open side disposed toward said tray, a rod slidably supported in said groove; an arm secured to said rod and extending through the open side of said groove; and agitating means carried by said arm adapted to be slid along the bottom of said tray.

11. Means for agitating the contents of a freezing tray comprising, a split tube; a rod slidably mounted in said split tube, said rod having an arm depending therefrom and extending through the split of said tube; agitating means carried by said arm; and means for supporting the opposite ends of said split tube relatively to a tray.

12. Means for agitating the contents of a freezing tray comprising, a tube slotted lengthwise thereof; a plurality of spaced brackets carried by said tube, said brackets being positionable upon opposite edges of a freezing tray; a rod slidably mounted in said tube, said rod having an arm depending therefrom and extending through the slot of said tube; and agitating means carried by said arm.

13. An accessory for use with a freezing tray comprising, a tubular member slotted longitudinally along the lower side thereof; brackets carried by said tubular member, at least one of said brackets being longitudinally slidable upon said tubular member; a rod slidably mounted in said tubular member; means at one end of said rod adapted to be gripped for reciprocating said rod; and agitating means supported by the opposite end of said rod.

14. An accessory for use with freezing trays of various size comprising, a tubular member having a slot extending lengthwise thereof; bracket members mounted upon said tubular member, at least one of said bracket members being longitudinally adjustable on said tubular member and at least one of said bracket members having a gap formed therein in alignment with the slot in said tubular member; a rod slidably guided in said tubular member; an arm depending from said rod and movable through said slot and gap; and an agitator element carried by said arm.

15. Means for making a substantially smooth and grainless dessert comprising, a tray; a cover for said tray, said cover being bent to provide an elongated groove extending lengthwise thereof, said groove being open on the side thereof adjacent to said tray; a rod slidably guided in said groove; an arm secured to said rod and extending through the open side of said groove; agitating means carried by said arm received in said tray and slidable along the bottom thereof; and means for maintaining said tray and cover in assembled relation.

ROLAND H. MONEY.